United States Patent
Lee et al.

(10) Patent No.: US 9,272,738 B2
(45) Date of Patent: Mar. 1, 2016

(54) STRUCTURE FOR CONNECTING WHEEL HOUSE PANEL TO REAR FLOOR OF VEHICLE

(71) Applicants: Hyundai Motor Company, Seoul (KR); Kia Motors Corporation, Seoul (KR)

(72) Inventors: In-Bum Lee, Seoul (KR); Ji-Won Chang, Yongin-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/504,742

(22) Filed: Oct. 2, 2014

(65) Prior Publication Data
US 2015/0137559 A1    May 21, 2015

(30) Foreign Application Priority Data
Nov. 15, 2013   (KR) .......................... 10-2013-138769

(51) Int. Cl.
| B62D 25/08 | (2006.01) |
| B62D 27/02 | (2006.01) |
| B62D 25/20 | (2006.01) |

(52) U.S. Cl.
CPC ............ B62D 27/023 (2013.01); B62D 25/087 (2013.01); B62D 25/20 (2013.01); B62D 25/2036 (2013.01)

(58) Field of Classification Search
CPC ... B62D 25/2036; B62D 25/087; B62D 25/16
USPC ............. 296/187.08, 187.12, 193.07, 193.05, 296/198, 30
See application file for complete search history.

(56) References Cited

U.S. PATENT DOCUMENTS

| 6,773,057 | B2 * | 8/2004 | Nomura ....................... 296/198 |
| 8,075,047 | B2 | 12/2011 | Yamada et al. |
| 2002/0043814 | A1 * | 4/2002 | Weiman .......................... 296/29 |
| 2005/0073174 | A1 * | 4/2005 | Yamaguchi et al. ..... 296/203.04 |
| 2007/0138837 | A1 * | 6/2007 | Tomioka .................. 296/203.04 |
| 2009/0289475 | A1 * | 11/2009 | Walter et al. ............. 296/203.01 |
| 2010/0032229 | A1 * | 2/2010 | Kim .............................. 180/312 |
| 2010/0078970 | A1 * | 4/2010 | Kim .............................. 296/198 |
| 2010/0133879 | A1 * | 6/2010 | Leonetti et al. .......... 296/193.08 |
| 2011/0156447 | A1 * | 6/2011 | Matsuoka et al. ....... 296/203.04 |
| 2013/0049392 | A1 * | 2/2013 | Kurogi et al. ................... 296/30 |
| 2013/0082482 | A1 * | 4/2013 | Kim .............................. 296/198 |
| 2015/0108791 | A1 * | 4/2015 | Mildner et al. ............... 296/198 |

FOREIGN PATENT DOCUMENTS

EP         1 808 362 A2    7/2007

* cited by examiner

*Primary Examiner* — Jason S Morrow
(74) *Attorney, Agent, or Firm* — Morgan, Lewis & Bockius LLP

(57) ABSTRACT

A structure for connecting a wheel house panel with a rear floor of a vehicle, which connects the rear floor forming a rear portion of a bottom of the vehicle with the wheel house panel on which shock absorber mounting brackets attached to both sides of the rear floor and supporting a shock absorber are mounted may include a first member bending between a lower end of an inner side of the wheel house panel and a side of the rear floor, with both ends attached to the wheel house panel and the rear floor, respectively, a second member vertically elongated and attached to an outer side of the wheel house panel and disposed behind the shock absorber mounting brackets, and a third member vertically elongated and attached to the outer side of the wheel house panel and disposed in front of the shock absorber mounting brackets.

4 Claims, 4 Drawing Sheets

STRUCTURE FOR CONNECTING WHEEL HOUSE PANEL TO REAR FLOOR OF VEHICLE

CROSS-REFERENCE TO RELATED APPLICATION

The present application claims priority to Korean Patent Application No. 10-2013-138769 filed Nov. 15, 2013, the entire contents of which is incorporated herein for all purposes by this reference.

BACKGROUND OF THE INVENTION

1. Field of the Invention

The present invention relates to a structure for connecting a wheel house panel to a rear floor of a vehicle, and more particularly to a structure for connecting a wheel house panel to a rear floor of a vehicle which improves durability of the part connecting a wheel house panel and a rear floor by including a first member attached to the wheel house panel and the rear floor, on the inner side of the wheel house panel, and a second member and a third member attached to the outer side of the wheel house panel.

2. Description of Related Art

In general, a vehicle is largely composed of a body and a chassis. The body is the part defining the outer shape of the vehicle and the chassis is the part where the minimum mechanical devices for driving the vehicle are mounted.

Pillars that support the front doors and rear doors, form the entire shape of the body, and keep the strength of the sides of the body are attached to the edges of the front doors and the rear doors at both sides of the body.

The pillars are a front door that is arranged in the front-rear direction of a vehicle at a predetermined angle toward the front of the body to be able to support the front door in contact with the rear of the engine room at the front part of the body and a center pillar that is arranged vertically between the front door and the rear door and supports the front door and the rear door and the side of the body which is open by the doors, and a rear pillar that is coupled to the rear end of the rear door and supports the rear door and the rear portion of the body.

In general, the pillars make a ring-shaped structure by combining with a roof rail on the roof of the body and the floor cross member to be able to increase the entire structural strength of the body.

As shown in FIG. 1, according to the structure for connecting a wheel house panel and a rear floor of a vehicle in the related art, a rear floor 1 is formed on the rear portion of the bottom of the vehicle, a wheel house panel 2 with a shock absorber mounting bracket 3 is attached to both sides of the rear floor 1, and a rear floor cross member 4 and a wheel house cover 6 are mounted on the rear floor 1 and the wheel house panel 2, respectively.

As shown in FIG. 1, the rear floor cross member 4 and the wheel house cover 6 are connected by a connecting member 5, and the rear floor cross member 4, the connecting member 5, and the wheel house cover 6 are arranged in a line to make a ring-shaped structure around the rear pillar of the vehicle.

However, as shown in FIG. 1, the rear floor cross member 4, the connecting member 5, and the wheel house cover 6 that are connected in a line are spaced from the shock absorber mounting bracket 3 because of a spatial limit due to the layout of the rear portion of the body, so the strength of the connecting portion between the wheel house panel 2 and the rear floor 1 decreases.

That is, reinforcement of the shock absorber mounting bracket 3 that is a load input part is insufficient and the inveterate problem with durability is caused due to the phase difference between the rear floor cross member 4, connecting member 5, wheel house cover 6 and the shock absorber mounting bracket 3, and thus the input point strength of the connecting portion between the wheel house panel 2 and the rear floor 1 decreases.

Further, when the thickness of the connecting member is increased or a specific reinforcing member is combined to solve this problem, the manufacturing cost and the weight of the body are increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a structure for connecting a wheel house panel with a rear floor of a vehicle which improves durability and input point strength of the connecting portion between the wheel house panel and the rear floor without a specific reinforcing member by supporting a shock absorber mounting bracket, which is a load input part at the rear portion of a vehicle, with a first member, a second member, and a third member.

According to various aspects of the present invention, a structure for connecting a wheel house panel with a rear floor of a vehicle, which connects a rear floor forming a rear portion of the bottom of a vehicle with a wheel house panel on which shock absorber mounting brackets attached to both sides of the rear floor and supporting a shock absorber are mounted, may include a first member bending between a lower end of an inner side of the wheel house panel and a side of the rear floor, with both ends attached to the wheel house panel and the rear floor, respectively, a second member vertically elongated and attached to an outer side of the wheel house panel and disposed behind the shock absorber mounting brackets; and a third member vertically elongated and attached to the outer side of the wheel house panel and disposed in front of the shock absorber mounting brackets.

The first member may be arranged to have a vertical center line that coincides with a vertical center line of the shock absorber mounting bracket, at the lower end of the shock absorber mounting bracket The first member, the second member, and the third member may have a U-shaped cross-sections defining closed spaces between each of the first, second and third members and the wheel house panel.

A first member flange brought in surface contact with the inner side of the wheel house panel and the rear floor may be integrally formed at an upper portion, a lower portion, and both sides of the first member, and a second member flange and a third member flange that are brought in surface contact with the outer side of the wheel house panel may be integrally formed at both sides of the second member and the third member respectively.

The first member may be disposed on the wheel house panel, between the second member and the third member, and the first member flanges at both sides of the first member may be disposed to face the second member flange at a side of the second member and the third member flange at a side of the third member with the wheel house panel therebetween, and may be matchingly-welded on the wheel house panel.

An effect of the present invention having the configuration described above is to improve durability and input point strength of the connecting portion between the wheel house panel and the rear floor without a specific reinforcing member by supporting the shock absorber mounting bracket, which is a load input part at the rear portion of a vehicle, in a zigzag shape with the first member, the second member, and the third member.

In detail, according to an examination analyzing the connecting portion of the wheel house panel and the rear floor, the durability index increases from 1.08 to 2.0 (infinite lifespan) and the input point strength increases from 700 kgf/mm to 2500 kgf/mm, in comparison to the connecting structure of a wheel house panel and a rear floor of the related art.

Further, there is an effect of reducing the manufacturing cost and the weight of a body of a vehicle because it is possible to remove the rear floor cross member and the wheel house cover which were used in the connecting structure of a wheel house panel and a rear floor of the related art.

Further, there is an effect of simplifying the assembly process because the structure is simple and of reducing the assembly time and works because parts can be easily combined, in comparison to the connecting structure of a wheel house panel and a rear floor of the related art.

Further, there is an effect of improving NVH (Noise Vibration Harshness) of a vehicle because noise and vibration are attenuated with an increase in durability of the connecting portion of the wheel house panel and the rear floor.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
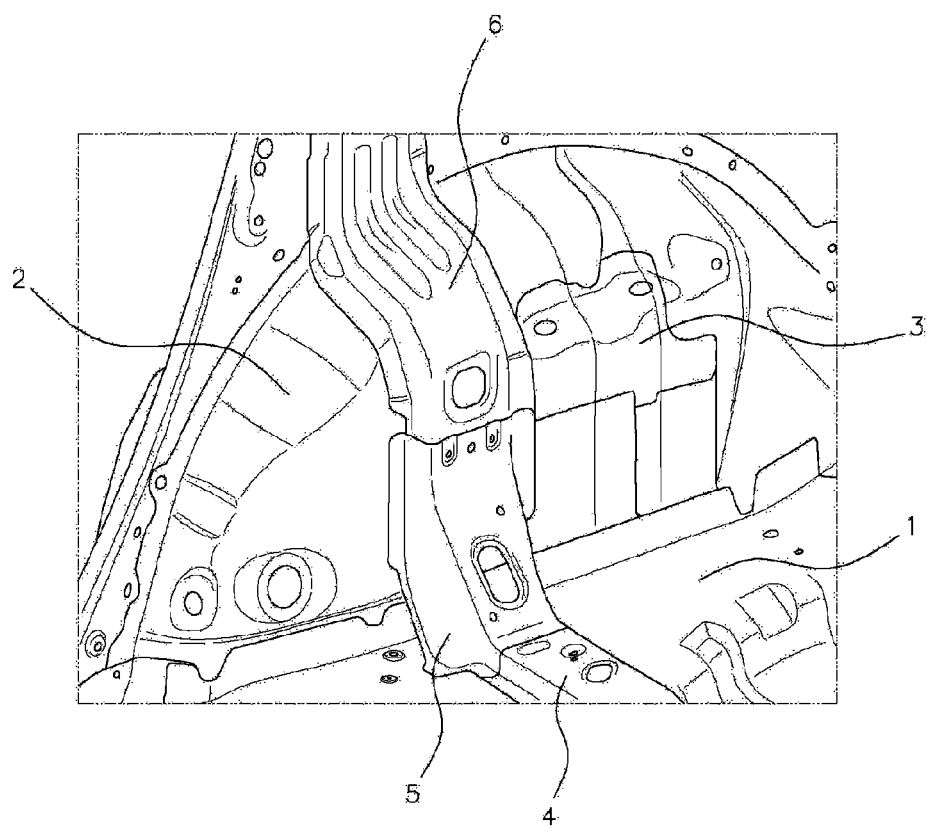
FIG. 1 is a perspective view showing a structure for connecting a wheel house panel with a rear floor of a vehicle inside the vehicle in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A structure for connecting a wheel house panel with a rear floor of a vehicle, which connects a rear floor 10 forming the rear portion of a bottom of the vehicle with a wheel house panel 20 on which shock absorber mounting brackets 22 attached to both sides of the rear floor 10 and supporting a shock absorber are mounted, includes a first member 30 that bends between a lower end of an inner side of the wheel house panel 20 and a side of the rear floor 10, with both ends attached to the wheel house panel 20 and the rear floor 10, respectively, a second member 40 that is vertically elongated and attached to an outer side of the wheel house panel 20 and disposed behind the shock absorber mounting bracket 22, and a third member 50 that is vertically elongated and attached to the outer side of the wheel house panel 20 and disposed ahead of the shock absorber mounting brackets 22.

Figure 2:
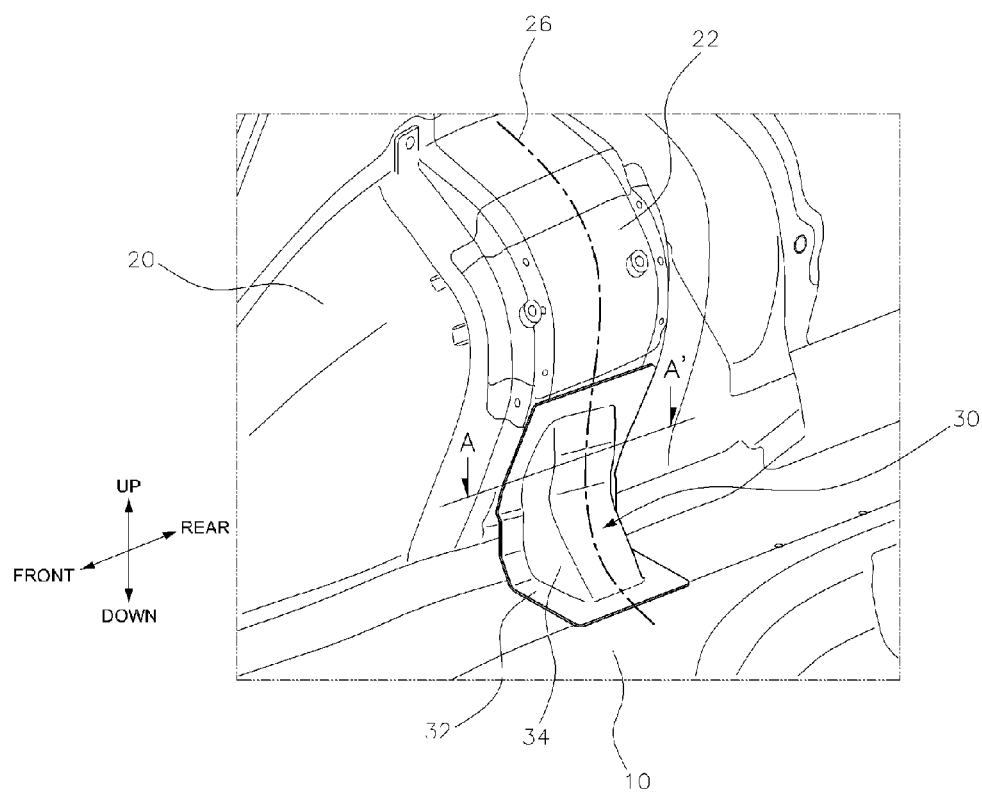
FIG. 2 is a perspective view showing an exemplary structure for connecting a wheel house panel with a rear floor of a vehicle inside the vehicle according to the present invention.

As shown in FIG. 2, the wheel house panel 20 bending along a wheel of the vehicle is attached to both sides of the rear floor 10 that forms the rear portion of the bottom of the vehicle.

As shown in FIG. 2, the shock absorber mounting bracket 22 is attached to the top of the wheel hose panel 20 to be able to support a shock absorber of the vehicle and functions as a load input part at the rear portion of the body.

As shown in FIG. 2, the first member 30 bending between the inner side of the wheel house 20 and the rear floor 10 increases the strength of the connecting portion between the wheel house panel 20 and the rear floor 10.

In detail, the first member 30 is attached to the lower portion of the wheel house panel 20 and the side of the rear floor 10, and a side 34 of the first member 30 bends to form an inclined surface at a predetermined angle with respect to the wheel house panel 20, when seen from the front or rear of the vehicle.

That is, as shown in FIG. 2, the first member 30 has the side 34 close to a right triangle and smoothly extends from the wheel house panel 20 to the rear floor 10.

Although the side 34 of the first member 30 is formed close to a right triangle in the embodiment of the present invention, the side 34 of the first member 30 may be formed in various shapes such as a triangle, a rectangle, and a curved shape, depending on the type of the vehicle, satisfaction of desired strength conditions, a structural change of the rear quarter of the vehicle and various other factors.

Figure 3:
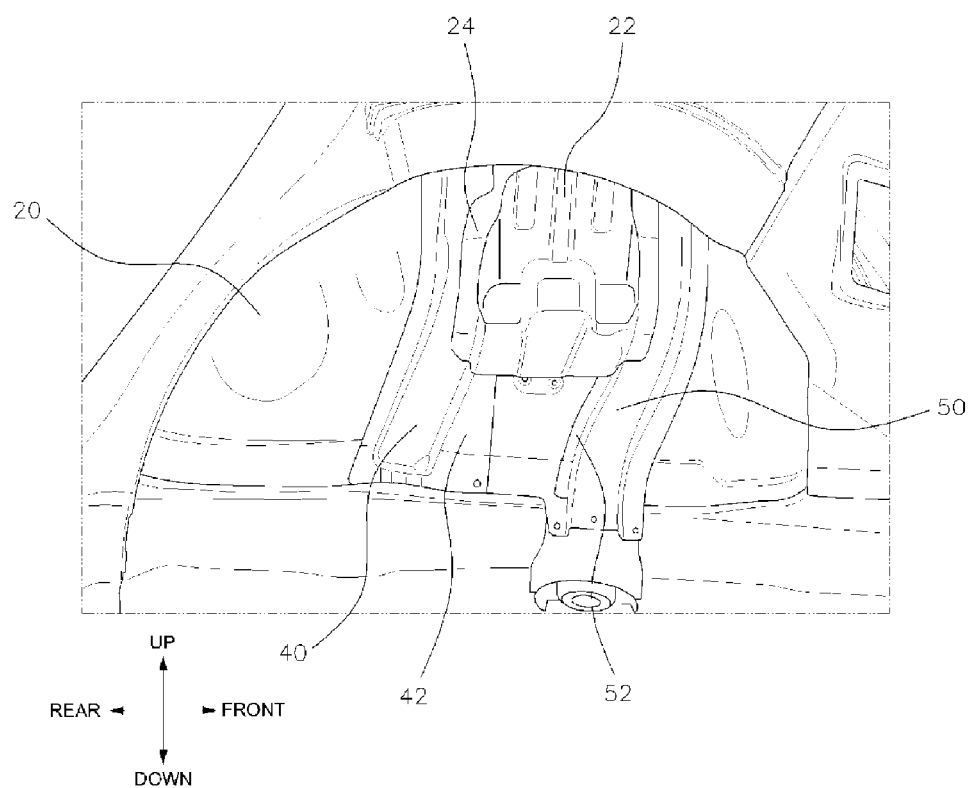
FIG. 3 is a perspective view showing the exemplary structure for connecting a wheel house panel with a rear floor of a vehicle outside the vehicle according to the present invention.

As shown in FIG. 3, the second member 40 and the third member 50 which are vertically elongated are attached to the rear and the front of the shock absorber mounting bracket 22, respectively, on the outer side of the wheel house panel 20.

As shown in FIG. 3, the second member 40 and the third member 50 are curved to the inside of the vehicle to be able to come in surface contact with the wheel house panel 20, corresponding to the curved side of the wheel house panel 20.

As shown in FIG. 3, the shock absorber mounting bracket 22 attached to the wheel house panel 20 has a shock absorber mounting bracket flange 24 extending along its edge and the shock absorber mounting bracket flange 24 has a surface corresponding to the surfaces of the second member 40 and the third member 50 and may be in contact with the second member 40 and the third member 50.

As described above, since three reinforcing members of the first member 30, the second member 40, and the third member 50 are attached to the inner side and the outer side of the wheel house panel 20, the input point strength at the rear portion of the vehicle is considerably improved.

As shown in FIG. 2, the first member 30 may be arranged to have a vertical center line 26 that coincides with the vertical center line 26 of the shock absorber mounting bracket 22, at the lower end of the shock absorber mounting bracket 22.

That is, as shown in FIG. 2, the shock absorber mounting bracket 22 and the first member 30 are attached, in a line, to the upper portion and the lower portion of the wheel house panel 20.

As shown in FIG. 1, the connecting member 5 that connects the rear floor cross member 4 and the wheel house cover 6 is spaced from the shock absorber mounting bracket 3, so the shock absorber mounting bracket 3 cannot be reinforced in the related art, but as shown in FIG. 2, the first member 30 according to the present invention is disposed in a line with the shock absorber mounting bracket 22, so the input point strength of the shock absorber mounting bracket 22 is increased.

Figure 4:
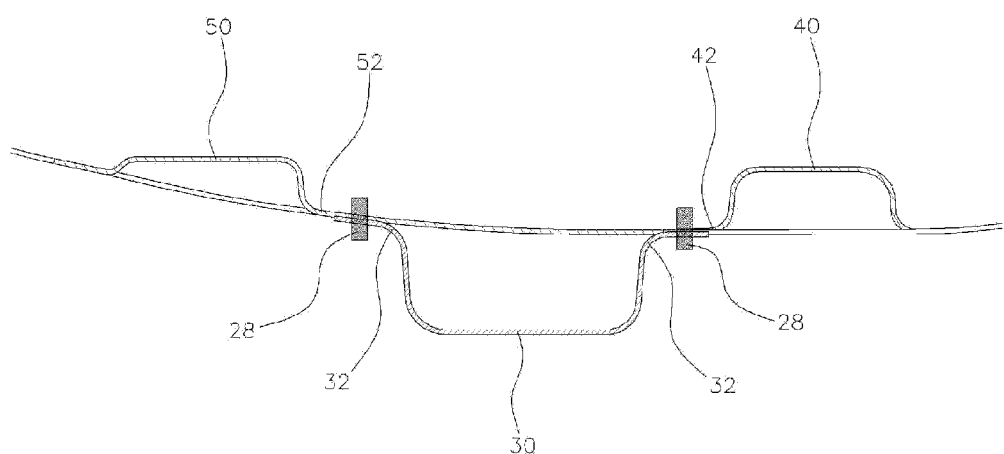
FIG. 4 is a cross-sectional view taken along line A-A' of FIG. 2 according to the present invention.

As shown in FIGS. 2 to 4, the first member 30, the second member 40, and the third member 50 may have U-shaped cross-sections to be able to define closed spaces with the wheel house panel 20.

That is, as shown in FIG. 4, three reinforcing members having the U-shaped cross-section are arranged in a zigzag on the inner side and the outer side of the wheel house panel 20, supporting the wheel house panel 20.

As described above, as the first member 30, the second member 40, and the third member 50 define closed spaces with the wheel house panel 20, the three closed spaces can support the wheel house panel 20, so the input point strength of the wheel house panel 20 is remarkably increased, as compared with a case without the closed spaces.

Cracks that are generated at the connecting portion between the wheel house panel and the rear floor due to loads from the road when the vehicle is running are greatly reduced because the loads are distributed to other portions around the body through the first member 30, the second member 40, and the third member 50.

As shown in FIG. 2, a first member flange 32 is formed around the first member 30 to be brought in surface contact with the inner side of the wheel house panel 20 and the rear floor 10, and as shown in FIG. 3, a second member flange 42 and a third member flange 52 are formed at the sides of the second member 40 and the third member 50 respectively to be brought in surface contact with the outer side of the wheel house panel 20.

That is, as shown in FIG. 2, the first member flange 32 provides an attachment surface so that the first member 30 can be completely brought in close contact with the wheel house panel 20 and the rear floor 10 by making a surface completely fitting to the lower inner side of the wheel house panel 20 and the side of the rear floor 10.

Similarly, as shown in FIG. 3, the second member flange 42 and the third member flange 52 provide attachment surfaces so that the second member 40 and the third member 50 can be completely brought in close contact with the wheel house panel 20 by making a surface completely fitting to the outer side of the wheel house panel 20.

As shown in FIG. 4, the first member 30 may be disposed between the second member 40 and the third member 50, opposite the second member 40 and the third member 50 with the wheel house panel 20 therebetween.

That is, as described above, from the front of the vehicle, the third member 50 is disposed on the outer side of the wheel house panel 20, the first member 30 is disposed on the inner side of the wheel house panel 20 orthogonally from the third member 50, and the second member 40 is disposed on the outer side of the wheel house panel 20 orthogonally from the first member 30, thereby forming a zigzag structure.

Further, as shown in FIG. 4, the first member flanges 32 at both sides of the first member 30 may be disposed to face the second member flange 42 at a side of the second member 40 and the third member flange 52 at a side of the third member 50, with the wheel house panel 20 therebetween, and attached at matching welding points 28 on the wheel house panel 20.

The first member flanges 32 may be integrally formed at the upper portion, the lower portion, and both sides of the first member In various embodiments the third member flange 52 at a front portion of the vehicle is disposed to face the first member flange 32 at the front portion of the vehicle with the wheel house panel 20 therebetween and attached at the matching welding point 28, and the second member flange 42 at a rear portion of the vehicle is disposed to face the first member flange 32 at the rear portion of the vehicle with the wheel house panel 20 therebetween and attached at the matching welding point 28.

That is, as shown in FIG. 4, the first member flange 32, the wheel house panel 20, and the second member flange 42 are combined by welding, overlapping each other, and in the same way, the first member flange 32, the wheel house panel 20, and the third member flange 52 are combined by welding, overlapping each other.

Further, as shown in FIGS. 2 and 3, the first member flanges 32 at the top of the first member 30 are disposed to face the shock absorber mounting bracket flanges 24 at the lower end of the shock absorber mounting bracket 22 with the wheel house panel 20 therebetween, and the first member flanges 32, the wheel house panel 20, and the shock absorber mounting bracket flanges 24 are combined by welding, overlapping each other.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present inven-

What is claimed is:

1. A structure for connecting a wheel house panel with a rear floor of a vehicle which connects the rear floor forming a rear portion of a bottom of the vehicle with the wheel house panel on which shock absorber mounting brackets attached to both sides of the rear floor and supporting a shock absorber are mounted, the structure comprising:
   a first member bending between a lower end of an inner side of the wheel house panel and a side of the rear floor, with both ends attached to the wheel house panel and the rear floor, respectively, wherein the first member is formed as a single body;
   a second member vertically elongated and attached to an outer side of the wheel house panel and disposed behind the shock absorber mounting brackets; and
   a third member vertically elongated and attached to the outer side of the wheel house panel and disposed in front of the shock absorber mounting brackets,
   wherein the first member has a U-shaped cross-section protruding from the wheel house panel towards the inner side of the vehicle to form a closed vacant space between the first member and the wheel house panel, and
   wherein the second member and the third member have U-shaped cross-sections protruding from the wheel house panel towards the outer side of the vehicle to form closed vacant spaces between the second and third members and the wheel house panel.

2. The structure of claim 1, wherein the first member is arranged to have a vertical center line coinciding with a vertical center line of the shock absorber mounting bracket, at a lower end of the shock absorber mounting bracket.

3. The structure of claim 1,
   wherein first member flanges brought in surface contact with the inner side of the wheel house panel and the rear floor are integrally formed at an upper portion, a lower portion, and both sides of the first member, and
   wherein a second member flange and a third member flange brought in surface contact with the outer side of the wheel house panel are integrally formed at both sides of the second member and the third member respectively.

4. The structure of claim 3,
   wherein the first member is disposed on the wheel house panel, between the second member and the third member, and
   wherein the first member flanges at both sides of the first member are disposed to face the second member flange at a side of the second member and the third member flange at a side of the third member with the wheel house panel therebetween, and are matchingly-welded on the wheel house panel.

* * * * *